Aug. 26, 1924.

F. D. MOYER 1,506,196

DRY BATTERY

Filed Aug. 25, 1920

Inventor:
Floyd Dewey Moyer,
By Byrne Townsend & Brickenstein
Attorneys.

Patented Aug. 26, 1924.

1,506,196

UNITED STATES PATENT OFFICE.

FLOYD DEWEY MOYER, OF FREMONT, OHIO, ASSIGNOR TO NATIONAL CARBON COMPANY, INC., A CORPORATION OF NEW YORK.

DRY BATTERY.

Application filed August 25, 1920. Serial No. 405,789.

*To all whom it may concern:*

Be it known that I, FLOYD DEWEY MOYER, a citizen of the United States, residing at Fremont, in the county of Sandusky and State of Ohio, have invented certain new and useful Improvements in Dry Batteries, of which the following is a specification.

This invention relates to dry batteries of the deferred action type, and particularly to that kind of batteries in which deterioration is prevented by the absence of electrolyzing liquid during the period before the battery is placed in service.

Dry batteries are commonly constructed with a layer of electrolyte-containing paste adjacent the zinc electrode and distinct advantages are known to result from this arrangement. Dry batteries "breathe", that is, eject gases through the battery casing by way of interstices which are always present, for example, between the electrodes and the pitch seal commonly employed, and take in atmospheric air through the same passages. One effect of the oxygen thus entering the cell is to partially depolarize the local action which takes place at the surface of the zinc electrode. This results in a large increase in the destructive effect of local action upon the zinc.

A layer of paste covering the active surface of the zinc tends to prevent the depolarizing effect of atmospheric oxygen on the local action and hence to minimize the useless consumption of zinc. At the same time the paste, which contains water and electrolyte salts, adds little to the internal resistance of the battery. The use of paste in dry cells has other advantages but that above described is one of the most important.

Dry cells of the deferred action type have heretofore been proposed in which a supply of paste was either contained in the cell or placed in an auxiliary package. Such cells were obviously not completely dry in their inactive condition and complete dryness is advantageous in certain respects. Other proposed deferred action cells have been perfectly dry but have no provision for the use of paste. A primary object of the present invention is to provide a deferred action type of cell which may be maintained in a perfectly dry state during its dormant or inactive period, and in which a layer of paste-forming material expands directly into contact with the zinc electrode, when the cell is activated.

Another defect which has existed in the heretofore proposed deferred action cells requiring the addition of water for their activation, is the length of time which has been required to wet the depolarizing mix sufficiently to bring the battery into efficient condition. The depolarizing mix is necessarily in quite compact condition when formed into an electrode, and water therefore permeates it comparatively slowly. The difficulty has been greatly increased by the fact that in prior designs the added water has been able to come into contact with only a limited surface of the depolarizing mix. When the mix is formed into a cylindrical bobbin, the outer cylindrical surface is manifestly the logical place to apply water if the mix is to be wetted thoroughly and quickly. Since it is necessary that this surface shall be completely in electrical connection with the zinc when the battery is activated, in prior designs the body of depolarizing mix has been formed so that the bibulous coating on the exterior thereof initially contacts with the zinc. In this case, it is not available for the absorption of the added water. That is to say, in former designs it has not been possible to wet the bobbin from its outside and then fit it perfectly to the zinc electrode. For this reason the water has been added from the ends of the body of depolarizing mix, or into channels traversing it, resulting in slow activation or an expensive construction.

Another important object of the present invention is to provide a deferred action type of battery in which the largest surface of the depolarizing mix is available for the absorption of water and in which this surface will be brought into complete electrical connection with the zinc electrode by direct expansion of a paste-forming material when the cell is activated. Other objects of the invention will appear as the invention is described.

The manner in which the objects of the invention are attained will appear from the following description of an embodiment of the invention, taken in connection with the annexed drawing, in which—

Figure 1:
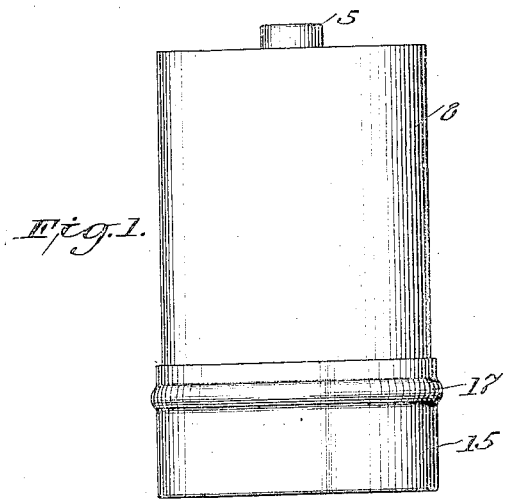
Fig. 1 is a side elevation view of the battery.
Figure 2:
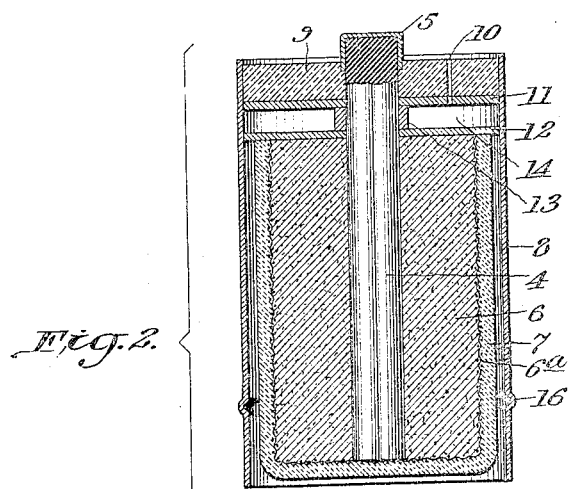
Fig. 2 is a view partly in longtudinal section and partly in elevation of a battery representing a preferred form of the invention, the battery being shown with the bottom cup removed.

In the drawing, 4 is a carbon rod electrode having the usual metal cap 5 and a bobbin 6 of depolarizing mix formed around its lower end. The bobbin 6 is wrapped in gauze or the like 6ª, and has its sides and bottom completely encased with a layer 7 of paste-forming substance. It is possible to omit the gauze wrapping 6ª and still obtain good results. The cost of production will obviously be reduced by such omission. However, I prefer to wrap the bobbin in gauze before enveloping it in the paste-forming material, as the gauze wrapping is an additional safeguard against breaking off of fragments of the depolarizing mix, and it also provides a better surface for holding the layer of paste-forming material.

The layer 7 may be applied as follows: 40 parts of wheat flour are intimately mixed with 26 parts of ammonium chloride. One part of mercuric chloride and 9 parts of zinc chloride are dissolved in 24 parts of water, and the flour-ammonium chloride mixture is worked into this solution in such a way as to form a smooth dough. It will be understood that the proportions of flour, water, and the various salts may be varied within quite wide limits and good results nevertheless be obtained. This dough is rolled out into a thin sheet like pie-crust, and a more or less uniform coating of the sheet dough is then applied to the bottom and sides of the bobbin. The bobbin is moist at this time, being formed from a moist mixture of carbon, manganese dioxide and electrolyte salts. The bobbin and its dough wrapping are then thoroughly dried, for example, by heating to about 90° C.

The dry coated depolarizing electrode is then mounted in a tubular zinc electrode 8, by means of a pitch seal 9, having a vent 10. Washers 11 and 12 of strawboard or the like, separated by spacing members 13, may be interposed between the depolarizing mix and seal 9 to form a gas space 14 within the cell.

The tubular electrode 8 is provided with a removable but tight closure 15 which will ordinarily be a zinc cup, though other materials, either conductive or non-conductive, and other forms of closure may be used. In the construction illustrated, the cup 15 is attached to the tubular electrode 8 by means of interlocking beads 16 and 17, and the cup 15 is provided with a disc 18 of waterproofed paperboard or the like adjacent its bottom to protect the bottom from corrosion.

With the bobbin and its wrapping thoroughly dry and the end-closure 15 in place on the zinc electrode 8, the battery forms a durable, strong and compact unit, requiring a minimum of space for storage and shipment. To activate the battery it is only necessary to remove the cup 15 and immerse the battery in water for a sufficient time to thoroughly moisten the mix-bobbin. The annular space between the coating 7 and zinc electrode 8 permits the water to reach the entire lateral surface of the bobbin, and the absorption of water takes place rapidly. As the bobbin becomes moistened, the bibulous layer 7 expands and becomes pasty, so that by the time the bobbin is sufficiently wet the layer 7 will have been transformed into a layer of paste, filling the entire space between the depolarizing mix and the zinc electrode. The condition of the battery is then similar in all respects to that of a freshly prepared battery of the type designed for immediate service after manufacture, and the battery incorporates all the advantageous features of cells of that type.

It will be apparent that the invention is susceptible of many modifications, especially with respect to the formation of the shape of the electrodes, the composition of the expansible paste-forming layer, and the method of applying the same. For this reason the scope of my invention is limited only by the appended claims.

I claim:

1. In a dry battery of the deferred action type, a depolarizing electrode having as exterior protective means, a dry bibulous coating which is expansible when wetted, and a second electrode separated from said coating by a space adapted to be occupied by said bibulous coating when the latter is expanded, and means whereby said bibulous coating may be wetted to activate said battery.

2. In a dry battery of the deferred action type, a depolarizing electrode having as exterior protective means, a dry bibulous paste-forming coating that is expansible when wetted, and a second electrode separated from said coating by a space whereby said coating may be wetted to expand the same to occupy said space and activate said battery.

3. In a dry battery of the deferred action type, a depolarizing electrode having as exterior protective means, a dry bibulous paste-forming coating, said coating containing electrolyte salts and being expansible when wetted, and a second electrode separated from said coating by a space whereby said coating may be wetted to expand the same to occupy said space and activate said battery.

4. In a dry battery of the deferred action type, a depolarizing bobbin electrode having as exterior protective means, a dry bibulous coating of farinaceous paste-forming material, said coating being expansible when wetted, a hollow electrode surrounding said bobbin electrode, and means whereby the entire outer surface of said bibulous coating may be wetted simultaneously to activate said battery.

5. In a dry battery of the deferred action type, a depolarizing bobbin electrode having as exterior protective means, a dry bibulous coating of farinaceous paste-forming material, said coating being expansible when wetted, a hollow electrode surrounding said bobbin electrode, and means comprising a detachable closure for said hollow electrode adapted to admit water into the latter to wet the outer surface of said bibulous coating.

6. In a dry battery of the deferred action type, a depolarizing bobbin electrode having as exterior protective means, a dry bibulous coating of farinaceous paste-forming material, said coating being expansible when wetted, a hollow zinc electrode surrounding said bobbin electrode, and means for admitting water into said hollow zinc electrode to wet the outer surface of said bibulous coating, said means including a detachable, tight-fitting zinc cup closing the lower end of said hollow electrode.

7. A dry-cell cathode having a bibulous coating of hardened plastic material.

8. A dry-cell cathode having a bibulous envelope of dried dough.

9. A dry-cell cathode having a bibulous coating of hardened farinaceous dough, said coating being expansible on wetting.

10. Process of coating bobbin electrodes which comprises enveloping the bobbins in plastic material and hardening the same.

11. Process of coating bobbin electrodes which comprises enveloping the bobbins in plastic material and then hardening the coating by removing liquid from said plastic material.

12. Process of coating bobbin electrodes which comprises forming a sheet of farinaceous dough, enveloping the bobbins in the dough sheet, and then drying the dough.

In testimony whereof, I affix my signature.

FLOYD DEWEY MOYER.